US012571245B2

(12) United States Patent
Enders et al.

(10) Patent No.: US 12,571,245 B2
(45) Date of Patent: Mar. 10, 2026

(54) DAMPING SYSTEM FOR DAMPING A MOVEMENT OF A FLAP OF A VEHICLE

(71) Applicant: Stabilus GmbH, Koblenz (DE)

(72) Inventors: Stephan Enders, Koblenz (DE); Sebastian Lehnert, Nagoya (JP)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 18/915,082

(22) Filed: Oct. 14, 2024

(65) Prior Publication Data

US 2025/0129650 A1 Apr. 24, 2025

(30) Foreign Application Priority Data

Oct. 19, 2023 (DE) ......................... 102023128807.5

(51) Int. Cl.
*E05F 3/14* (2006.01)
*E05F 1/10* (2006.01)

(52) U.S. Cl.
CPC .............. *E05F 3/14* (2013.01); *E05F 1/1058* (2013.01); *E05Y 2201/242* (2013.01)

(58) Field of Classification Search
CPC ... E05F 3/14; E05F 1/1058; E05F 3/16; E05F 5/02; E05Y 2201/242; E05Y 2201/216
See application file for complete search history.

(56) References Cited

U.S. PATENT DOCUMENTS 484,587 A * 10/1892 Gould ..................... F16D 59/00 73/535
1,191,254 A * 7/1916 White ..................... F16D 59/00 400/338.1

(Continued)

FOREIGN PATENT DOCUMENTS

DE 202011106110 U1 1/2013
DE 102022100147 B3 3/2023
DE 102021211930 A1 4/2023

OTHER PUBLICATIONS

German Search Report dated Apr. 12, 2024 for related German Patent Application No. 10 2023 128 807.5, 8 pages.

*Primary Examiner* — Jeffrey O'Brien
(74) *Attorney, Agent, or Firm* — Hovey Williams LLP; Kameron D. Kelly

(57) ABSTRACT

The invention relates to a damping system for damping a movement of a flap of a vehicle relative to a body of the vehicle. The damping system comprises two coupling elements for coupling the damping system to the flap and to the body, wherein the two coupling elements are connected to one another so as to be linearly displaceable relative to one another along a longitudinal axis of the damping system, and a spindle gear with a rotary element selected from a threaded spindle aligned along the longitudinal axis and a spindle nut guided on the threaded spindle. The spindle gear is connected to a first of the two coupling elements in such a way that the spindle gear translates a translation of the first coupling element relative to the second coupling element along the longitudinal axis into a rotation of the rotary element about the longitudinal axis. The damping system comprises a damping device and a centrifugal clutch, wherein the centrifugal clutch is configured to connect the rotary element to the damping device for damping the rotation of the rotary element when a speed of the rotary element exceeds a switching speed.

15 Claims, 4 Drawing Sheets

(56) References Cited

U.S. PATENT DOCUMENTS

| | | | | | |
|---|---|---|---|---|---|
| 3,645,363 | A * | 2/1972 | Fuths | B41J 19/02 400/338.1 |
| 4,015,696 | A * | 4/1977 | Lichti | F16D 59/00 188/189 |
| 5,971,055 | A * | 10/1999 | Rohaut | E06B 9/84 160/300 |
| 7,900,530 | B2 * | 3/2011 | Bochen | H02K 7/06 74/29 |
| 7,900,531 | B2 * | 3/2011 | Arenz | E05F 15/622 192/36 |
| 7,992,460 | B2 * | 8/2011 | Bochen | F16H 25/24 74/89.23 |
| 9,518,415 | B2 * | 12/2016 | Hsieh | E05F 3/16 |
| 12,098,581 | B2 * | 9/2024 | Wolf | F16D 41/203 |
| 12,227,981 | B2 * | 2/2025 | Schneiderbanger | E05F 1/1058 |
| 2008/0060273 | A1 * | 3/2008 | Bochen | E05F 15/622 49/340 |
| 2025/0067109 | A1 * | 2/2025 | Bartschies | E05F 15/622 |

* cited by examiner

DAMPING SYSTEM FOR DAMPING A MOVEMENT OF A FLAP OF A VEHICLE

RELATED APPLICATION

This U.S. patent application claims priority to German Patent Application No. 102023128807.5, filed on Oct. 19, 2024, which is hereby incorporated by reference in its entirety.

TECHNICAL FIELD

The invention relates to a damping system for damping a movement of a flap of a vehicle relative to a body of the vehicle. The damping system comprises two coupling elements for coupling the damping system to the flap and to the body, wherein the two coupling elements are connected to one another so as to be linearly displaceable relative to one another along a longitudinal axis of the damping system, and a spindle gear with a rotary element selected from a threaded spindle aligned along the longitudinal axis and a spindle nut guided on the threaded spindle. The spindle gear is connected to a first of the two coupling elements in such a way that the spindle gear translates a translation of the first coupling element relative to the second coupling element along the longitudinal axis into a rotation of the rotary element about the longitudinal axis.

The invention further relates to a vehicle with the damping system and a use of the damping system.

PRIOR ART

It is known to drive vehicle flaps, for example tailgates of motor vehicles, with a motorized drive attached to one side of the flap, for example with a spindle drive. On the other side of the flap, usually a damping element, for example a gas pressure spring with an overflow opening is attached, which dampens the movement of the flap. In particular, the damping element is intended to prevent the flap from closing under its own weight so quickly that the flap could cause property damage or personal injury if the drive becomes detached from the flap or the body or malfunctions.

The disadvantage of known damping elements is that they dampen the movement of the flap even during normal operation, and therefore the drive must be designed to be stronger, consumes more energy and wears out faster than without a damping element.

A further disadvantage of a gas pressure spring as a damping element is the temperature dependence of the spring force of a gas pressure spring. In order for the gas pressure spring to provide sufficient spring force to support the flap even at the lowest temperatures to be expected during vehicle operation, the gas pressure spring must be designed so that its spring force is higher than necessary above the lowest temperature. As a result, above the lowest temperature, the drive must apply increased force to close the flap against the spring force, which in turn increases energy consumption and wear of the drive.

Technical Object

The object of the invention is to allow a safe, economical and low-wear movement of a vehicle flap using simple means.

Technical Solution

The present invention provides a damping system in accordance with claim 1, which achieves the technical object. The object is also achieved by a vehicle with the damping system according to claim 14 and a use of the damping system according to claim 15. Advantageous designs are the subject matter of the dependent claims.

The damping system is configured to dampen a movement of a flap of a vehicle relative to a body of the vehicle. The vehicle is for example a motor vehicle, in particular a passenger car, a truck or a bus. The flap is, for example, a tailgate, a luggage compartment lid, a hood or a door of the vehicle. The movement is, for example, an opening movement, a closing movement and/or a pivoting movement of the flap.

The damping system comprises two coupling elements, wherein one of the two coupling elements is configured to couple the damping system to the flap and one to the body. The coupling elements comprise, for example, at least one ball socket, at least one ball stud, at least one eyelet and/or at least one bolt. The two coupling elements are connected to one another so as to move linearly relative to one another along a longitudinal axis of the damping system. The ability of the coupling elements to move relative to one another makes it possible to carry out the movement of the flap when one coupling element is coupled to the flap and one to the body. The movement of the flap leads to a displacement of the coupling elements relative to one another along the longitudinal axis.

The damping system comprises a spindle gear with a rotary element selected from a threaded spindle aligned along the longitudinal axis and a spindle nut guided on the threaded spindle, wherein the spindle gear is connected to a first of the two coupling elements in such a way that the spindle gear translates a translation of the first coupling element relative to the second coupling element along the longitudinal axis into a rotation of the rotary element about the longitudinal axis. The movement of the flap relative to the body therefore leads to a rotation of the rotary element, wherein a speed of rotation depends on a movement speed of the flap.

The rotary element is preferably the threaded spindle, so that the spindle nut is displaceable relative to the second coupling element along the longitudinal axis, and the threaded spindle is rotatable relative to the second coupling element about the longitudinal axis. A damping system which is particularly compact transverse to the longitudinal axis is thereby achieved. It is also conceivable within the scope of the invention to provide the spindle nut as a rotary element. In this case, the spindle nut can be made of plastics material, for example, and this allows for a particularly simple and economical construction.

The translation of the translation of the first coupling element into a rotation of the rotary element allows the use of a rotary damper connected to the rotary element to dampen the translation of the first coupling element. This results in the advantage that a rotary damper is particularly space-saving compared to a linear damper.

The spindle gear can also bring about a torque transmission, which results in the rotary damper connected to the rotary element having to apply a lower damping torque of, for example, 1 Nm in order to effectively dampen the movement of the flap than a rotary damper that would be directly connected to a rotation axis of the flap and would have to apply a damping torque of, for example, 50 Nm. This allows the rotary damper to be particularly light, small and economical.

The damping system comprises a damping device and a centrifugal clutch, wherein the centrifugal clutch is configured to connect the rotary element to the damping device for damping the rotation of the rotary element when a speed of the rotary element exceeds a switching speed.

Beneficial Effects

The switching speed is preferably selected so that the speed of the rotary element does not exceed the switching speed during normal operation of the flap. As a result, the damping device does not dampen the movement of the flap during normal operation so that the flap can be moved with little exertion of force. A motorized drive of the flap therefore has low energy consumption and low wear.

The switching speed is preferably selected so that the speed of the rotary element exceeds the switching speed when the flap moves so quickly that this could cause material damage to the vehicle or to an object located between the flap and the body, or personal injury. The rapid movement of the flap can be caused, for example, by the flap falling down because a motorized drive has become detached from the flap or from the body, or by a person slamming the flap shut with too much force.

If the speed exceeds the switching speed, the damping device dampens the movement of the flap. A damping torque of the damping device is preferably selected in such a way that the damping device slows down the movement of the flap to such an extent that there is no longer any risk of property damage or personal injury.

The damping system therefore allows for safe, economical and low-wear movement of the flap using simple means.

DESCRIPTION OF THE TYPES OF EMBODIMENTS

The centrifugal clutch preferably comprises an outer rotor rotatable about the longitudinal axis relative to the second coupling element and an inner rotor mounted in the outer rotor so as to be rotatable about the longitudinal axis relative to the outer rotor and to the second coupling element, wherein the rotary element of the spindle gear is connected to the inner rotor for transmitting its rotation to the inner rotor. The rotary element, in particular the threaded spindle, can be connected integrally, directly or indirectly to the inner rotor.

A translation of the first coupling element along the longitudinal axis relative to the second coupling element by a movement of the flap therefore sets the inner rotor in rotation about the longitudinal axis via the spindle gear. The arrangement of the inner rotor in the outer rotor results in a particularly compact construction of the centrifugal clutch.

The inner rotor is, for example, substantially cylindrical in shape and/or arranged coaxially to the longitudinal axis. The outer rotor is, for example, substantially hollow-cylindrical in shape and/or arranged coaxially to the longitudinal axis.

The inner rotor preferably comprises at least one connecting element which is configured to connect the inner rotor to the outer rotor for transmitting its rotation to the outer rotor when the speed of the rotary element exceeds the switching speed. The connection of the inner rotor to the outer rotor via the connecting element can be frictional and/or form-fitting with respect to the rotation about the longitudinal axis. The connection is established by the connecting element being driven from the inner rotor to the outer rotor by the centrifugal force that acts on the connecting element and increases with increasing speed.

To ensure the most homogeneous loading possible on the inner rotor and the outer rotor, the inner rotor preferably comprises two, three, four, five or more connecting elements which can in particular be evenly distributed around the longitudinal axis.

The switching speed can be adjusted, for example, via a static friction that holds the connecting element to the inner rotor, via a mass of the connecting element and/or via a spring force of a spring element that holds the connecting element to the inner rotor. The static friction can be adjusted, for example, via a material combination of the inner rotor and the connecting element, by a surface coating and/or by a surface structuring of the inner rotor and/or the connecting element.

The damping device is preferably connected to the outer rotor to dampen the rotation of the outer rotor. The damping device can be connected integrally, directly or indirectly to the outer rotor. Therefore when the speed of the rotary element exceeds the switching speed, the rotary element is connected to the damping device via the inner rotor, the connecting element and the outer rotor to dampen the rotation of the rotary element so that the damping device dampens the movement of the flap.

The connecting element is preferably configured to form-fittingly connect the inner rotor to the outer rotor with respect to a rotation about the longitudinal axis when the speed of the rotary element exceeds the switching speed. A form-fitting connection causes a particularly reliable transmission of rotation from the inner rotor to the outer rotor and therefore a particularly safe damping system.

The connecting element preferably comprises a displacement element mounted so as to be radially displaceable to the longitudinal axis relative to the inner rotor. As a displacement element, the connecting element can be designed very simply and can establish a form-fitting connection with the outer rotor in a particularly simple manner.

The connecting element can comprise a folding element that can be folded out from the inner rotor toward the outer rotor. A folding element has the advantage that a connection of the inner rotor to the outer rotor depending on the direction of rotation of the inner rotor can thereby be very easily realized, for example by the folding element engaging interlockingly in a recess in the outer rotor during rotation of the inner rotor in a blocking direction, and sliding out of the recess during rotation of the inner rotor against the blocking direction.

An inner surface of the outer rotor facing the inner rotor preferably comprises a recess for partially receiving the connecting element. This allows the connecting element to engage in the recess when the speed of the rotary element exceeds the switching speed, therefore establishing a form-fitting connection between the inner rotor and the outer rotor.

The recess is preferably shaped in such a way that the connecting element is driven out of the recess toward the longitudinal axis in a release direction during rotation of the inner rotor about the longitudinal axis relative to the outer rotor. For this purpose, the recess has, for example, a side surface aligned obliquely to a radial direction with respect to the longitudinal axis, on which the connecting element can slide out of the recess toward the longitudinal axis. This allows the rotary element to be released from the damping device after the switching speed has been exceeded by moving the flap so that the inner rotor rotates in the release direction. This allows for a resetting of the damping system from a damping state in which the rotary element is connected to the damping device to a normal state in which the rotary element is separated from the damping device. After resetting, the flap can be moved again with little resistance.

The damping system is preferably connected to the flap in such a way that the inner rotor rotates in the release direction upon lifting the flap. Accordingly, the damping system can be reset from the damping state to the normal state by lifting the flap.

The recess of the outer rotor is preferably shaped in such a way that the connecting element is blocked in the recess during rotation of the inner rotor relative to the outer rotor in a blocking direction about the longitudinal axis, preferably opposite the release direction. For this purpose, the recess has, for example, a side surface aligned along a radial direction with respect to the longitudinal axis, against which the connecting element comes into contact by rotation in the blocking direction.

The damping system is preferably connected to the flap in such a way that the inner rotor rotates in the blocking direction upon lowering the flap. This ensures a reliable connection of the rotary element with the damping device when the flap falls down.

The centrifugal clutch preferably comprises a spring element, wherein the spring element is configured to separate the rotary element from the damping device when the speed of the rotary element falls below the switching speed. This allows the damping system to automatically reset itself from the damping state in which the rotary element is connected to the damping device to the normal state in which the rotary element is separated from the damping device. After resetting, the flap can be moved again with little resistance. Furthermore, the switching speed of the damping system can be adjusted via the spring force of the spring element.

The spring element preferably connects the connecting element to the inner rotor in such a way that the spring element exerts a spring force on the connecting element directed toward the longitudinal axis. This allows the spring element to release the connecting element from the outer rotor when the speed of the rotary element is so low that a spring force of the spring element is greater than a centrifugal force acting on the connecting element.

The damping system preferably comprises a friction element, wherein the friction element frictionally connects the rotary element to the damping device for damping the rotation of the rotary element, independently of the speed of the rotary element. The friction element gives the damping system the additional function of a speed-independent friction brake for the movement of the flap. This allows a separate brake or one integrated into the flap drive to be omitted.

The friction element preferably comprises a tolerance ring, wherein the tolerance ring frictionally connects the inner rotor to the outer rotor of the centrifugal clutch and is preferably arranged coaxially between the inner rotor and the outer rotor. This design results in a particularly simple and compact construction of the damping system.

The damping device preferably comprises a fluid rotary damper. A fluid rotary damper is compact and provides a high and precisely defined damping torque to dampen the movement of the flap.

The damping device preferably comprises a friction surface fastened to the outer rotor and a mating friction surface fastened to the second coupling element of the damping system, wherein the friction surface interacts with the mating friction surface in a frictionally engaged manner. When the speed of the rotary element exceeds the switching speed, the outer rotor rotates with the rotary element relative to the second coupling element about the longitudinal axis. A frictional force between the friction surface and the mating friction surface therefore dampens the movement of the flap, wherein the damping system is designed very simply.

The friction surface comprises, for example, an outer surface of the outer rotor facing away from the longitudinal axis. The mating friction surface comprises, for example, an inner surface facing the longitudinal axis of a housing of the damping system fastened to the second coupling element.

The invention relates to a vehicle comprising a body, a flap movable relative to the body, and a damping system according to the invention, wherein one of the two coupling elements of the damping system is coupled to the flap and one to the body. This allows the damping system to advantageously dampen the movement of the flap as described above.

The invention relates to a use of a damping system according to the invention for damping a movement of a flap of a vehicle relative to a body of the vehicle, wherein one of the two coupling elements of the damping system is coupled to the flap and one to the body. This allows the damping system to advantageously dampen the movement of the flap as described above.

BRIEF DESCRIPTION OF THE DRAWINGS

Further advantages, objectives and properties of the invention are explained with reference to the following description and the accompanying drawings, in which exemplary embodiments according to the invention are shown. Identical or like or similar components are provided with the same reference sign. The drawings, the description, and the claims contain numerous features in combination. A person skilled in the art will expediently also consider the features individually and combine them to form expedient further combinations. Individual or multiple exemplary embodiments can therefore advantageously be combined with one another.

FIG. 1

FIG. 1 shows a schematic longitudinal section along the longitudinal axis LA of a damping system 100 according to the invention for damping a movement of a flap of a vehicle relative to a body of the vehicle.

Figure 1:
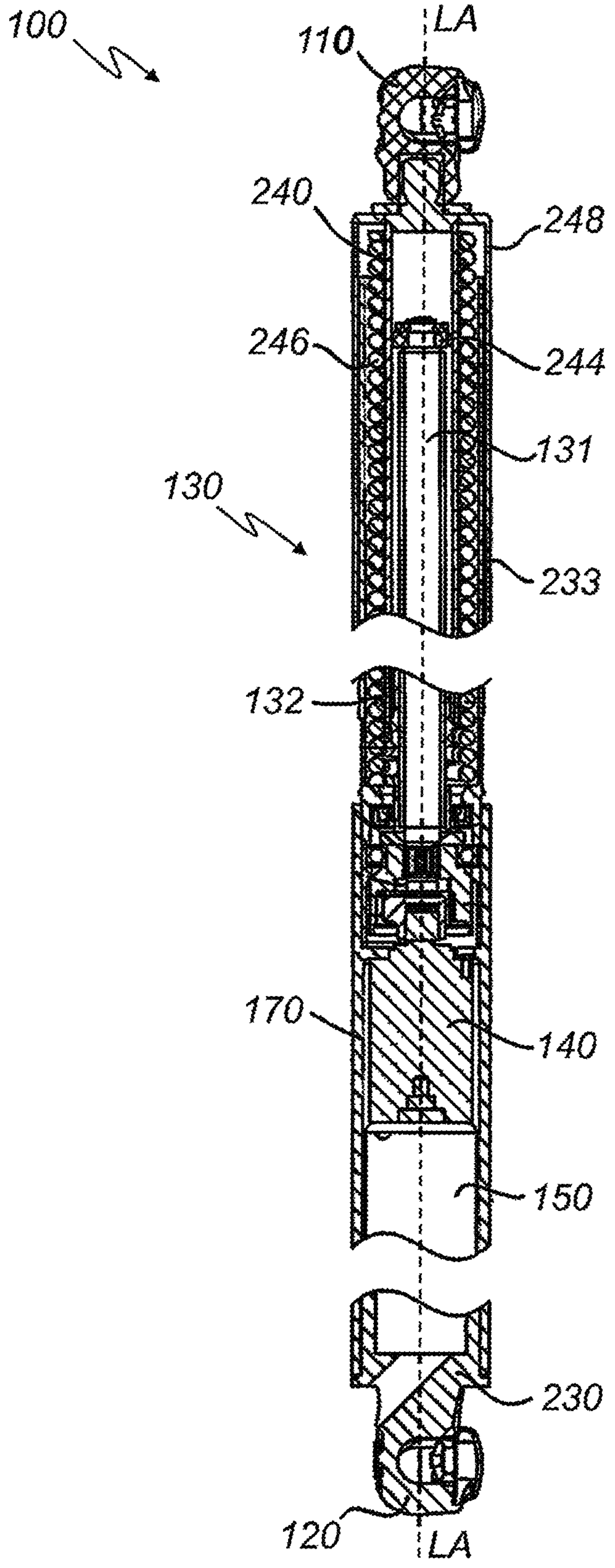
FIG. 1 shows a schematic longitudinal section of a damping system according to the invention.

The shown damping system 100 comprises two coupling elements 110, 120 which are designed, for example, as ball sockets, for coupling the damping system 100 to the flap and to the body, wherein the two coupling elements 110, 120 are connected to one another so as to be linearly displaceable relative to one another along the longitudinal axis LA of the damping system 100. If the damping system 100 is coupled to the flap and to the body, a movement of the flap relative to the body therefore leads to a change in the length of the damping system 100.

The shown damping system 100 comprises a spindle gear 130 with a rotary element which is designed, for example, as a threaded spindle 131 aligned along the longitudinal axis LA, on which a spindle nut 132 is guided. The spindle gear 130 is connected to a first of the two coupling elements 110 in such a way that the spindle gear 130 translates a translation of the first coupling element 110 which is fastened, for example, to the spindle nut 132, along the longitudinal axis LA relative to the second coupling element 120 into a rotation of the rotary element, for example the threaded spindle 131, about the longitudinal axis LA. When the flap of the vehicle moves relative to the body of the vehicle, the rotary element is thereby set in rotation, wherein the speed of the rotary element depends on the movement speed of the flap.

The shown damping system 100 comprises a damping device 150 and a centrifugal clutch 140, wherein the centrifugal clutch 140 is configured to connect the rotary element to the damping device 150 for damping the rotation of the rotary element when a speed of the rotary element, for example the threaded spindle 131, exceeds a switching speed. Consequently, the damping device 150 dampens a movement of the flap of the vehicle relative to the body of the vehicle when the movement speed of the flap exceeds a switching speed. The damping device 150 comprises, for example, a fluid rotary damper.

The damping device 150 and the centrifugal clutch 140 are accommodated, for example, in a housing 170, in particular in a housing tube. For example, a base piece 230 is attached to a free end of the housing 170 with respect to the longitudinal axis LA, to which the second coupling element 120 is fastened.

The spindle gear 130 is, for example, accommodated in a casing tube 233. The end of the threaded spindle 131 facing the second coupling element 120 is connected, for example, to the centrifugal clutch 140. An external thread of the threaded spindle 131 is in threaded engagement with an internal thread of the spindle nut 132 so that a translation of the spindle nut 132 along the longitudinal axis LA can be converted into a rotational movement of the threaded spindle 131 about the longitudinal axis LA.

The spindle nut 132 is connected, for example, to a guide tube 240, to the free end of which the first coupling element 110 is fastened. For example, a guide disk 244 is arranged at the end of the threaded spindle 131 facing away from the second coupling element 120 and engages with the inner surface of the guide tube 240. The guide tube 240 is surrounded, for example, by a helical spring 246 which counteracts a change in a length of the damping system 100 along the longitudinal axis LA compared to a resting length of the damping system 100. To protect the helical spring 246 from external influences, it is surrounded, for example, by a protective tube 248 which is also connected to the free end of the guide tube 240.

FIG. 2

Figure 2A:
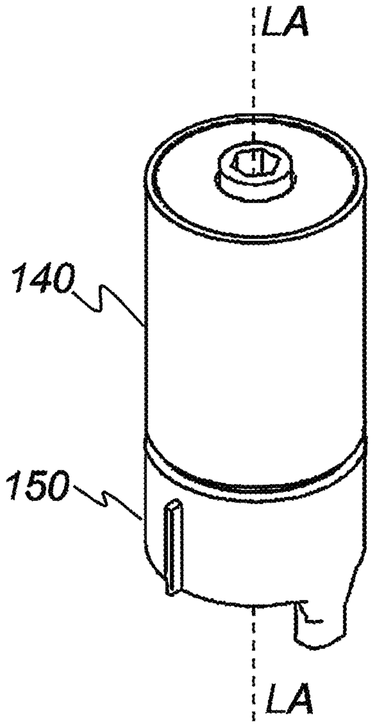
FIG. 2 shows a schematic representation of the centrifugal clutch and the damping device of a damping system according to the invention.
Figure 2B:
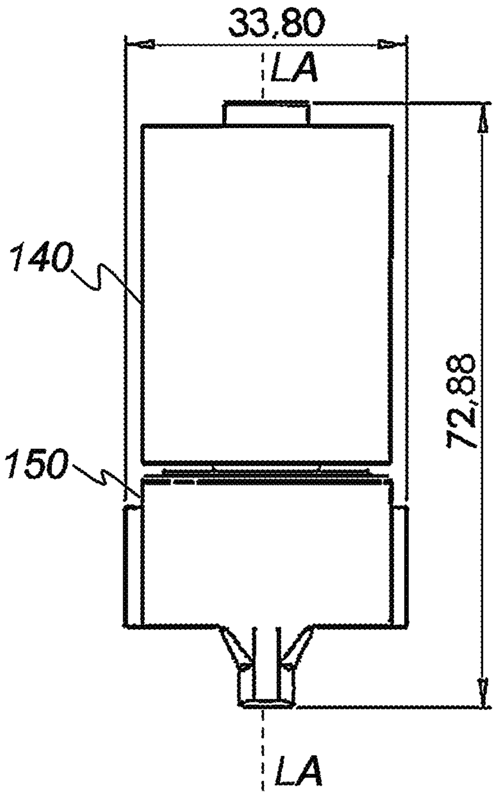

FIG. 2 shows a schematic representation of the centrifugal clutch 140 and the damping device 150 of a damping system 100 according to the invention as a perspective view (FIG. 2A) and as a side view (FIG. 2B). The side view is provided with exemplary dimensions in mm.

FIG. 3

Figure 3A:
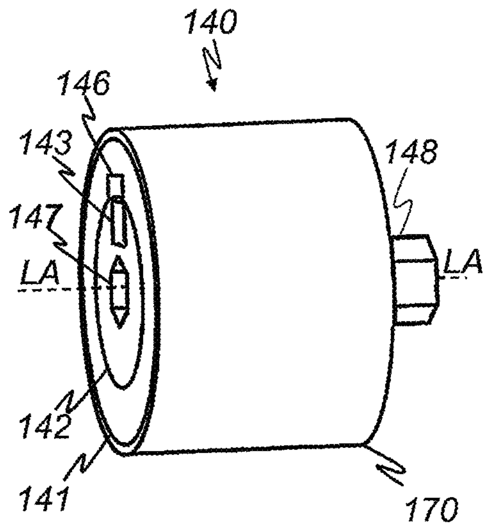
FIG. 3 shows a schematic representation of the centrifugal clutch of a damping system according to the invention.
Figure 3B:
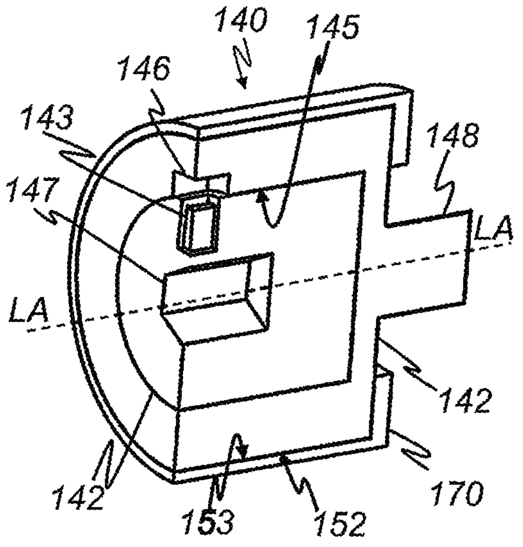

FIG. 3 shows a schematic representation of the centrifugal clutch 140 of a damping system 100 according to the invention as a side view (FIG. 3A) and as a section along the longitudinal axis LA of the damping system 100 (FIG. 3B).

The shown centrifugal clutch 140 comprises an outer rotor 141 rotatable about the longitudinal axis LA relative to the housing 170 of the damping system 100, and an inner rotor 142 rotatably mounted in the outer rotor 141 about the longitudinal axis LA relative to the outer rotor 141 and to the second housing 170.

The rotary element of the spindle gear 130, for example the threaded spindle 131 of the spindle gear 130, can be connected to the inner rotor 142 to transmit its rotation to the inner rotor 142. For the connection, the inner rotor 142 has, for example, an inner connecting element 147, in particular a receiving opening for a hexagonal projection. In the damping system 100 according to the invention, the inner connecting element 147 is connected, for example, to the threaded spindle 131 of the spindle gear 130.

The inner rotor 142 comprises a connecting element 143 which is configured to connect the inner rotor 142 to the outer rotor 141 for transmitting its rotation to the outer rotor 141 when the speed of the rotary element exceeds the switching speed.

The connecting element 143 is configured, for example, to form-fittingly connect the inner rotor 142 to the outer rotor 141 with respect to a rotation about the longitudinal axis LA when the speed of the rotary element exceeds the switching speed.

The connecting element 143 comprises, for example, a displacement element mounted so as to be radially displaceable to the longitudinal axis LA relative to the inner rotor 142. An inner surface 145 of the outer rotor 141 facing the inner rotor 142 comprises, for example, a recess 146 for partially receiving the connecting element 143. As a result, the centrifugal force caused by the rotation of the inner rotor 142 can drive the connecting element 143 radially out of the inner rotor 142 toward the longitudinal axis LA so that the connecting element 143 engages in the recess 146 and thereby form-fittingly connects the inner rotor 142 to the outer rotor 141 with respect to the rotation about the longitudinal axis LA when the speed of the rotary element exceeds the switching speed.

The damping device 150 can be connected to the outer rotor 141 to dampen the rotation of the outer rotor 141. For the connection, the outer rotor 141 has, for example, an external connecting element 148, in particular a hexagonal projection. The external connecting element 148 is connected in the damping system 100 according to the invention, for example, to a fluid rotary damper. Accordingly, the fluid rotary damper can dampen rotation of the inner rotor 142 and the associated rotary element, for example the threaded spindle 131, when the speed of the rotary element exceeds the switching speed.

Alternatively or in addition to the fluid rotary damper, the damping device 150 can comprise a friction surface 152 fastened to the outer rotor 141, for example the outer surface of the outer rotor, and a mating friction surface 153 fastened to the housing 170 of the damping system 100, for example the inner surface of the housing 170, wherein the friction surface 152 interacts with the mating friction surface 153 in a frictionally engaged manner. Accordingly, the friction surface 152 and the mating friction surface 153 can dampen rotation of the inner rotor 142 and the associated rotary element, for example the threaded spindle 131, when the speed of the rotary element exceeds the switching speed.

The damping system 100 can comprise a friction element that frictionally connects the rotary element to the damping device 150 for damping the rotation of the rotary element, independently of the speed of the rotary element. This dampens the movement of the flap of the vehicle relative to the body of the vehicle independently of the speed so that an additional brake can be omitted. The friction element can comprise a tolerance ring arranged between the inner rotor

142 and the outer rotor 141, which frictionally connects the inner rotor 142 to the outer rotor 141.

FIG. 4

Figure 4A:
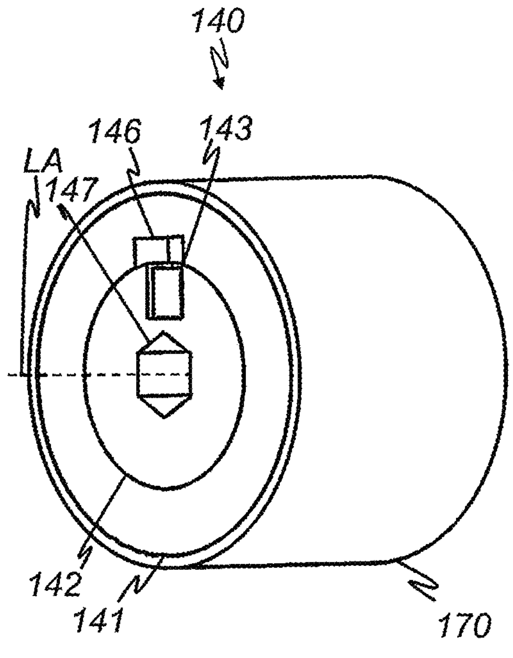
FIG. 4 shows a schematic representation of the centrifugal clutch of a damping system according to the invention at different speeds.
Figure 4B:
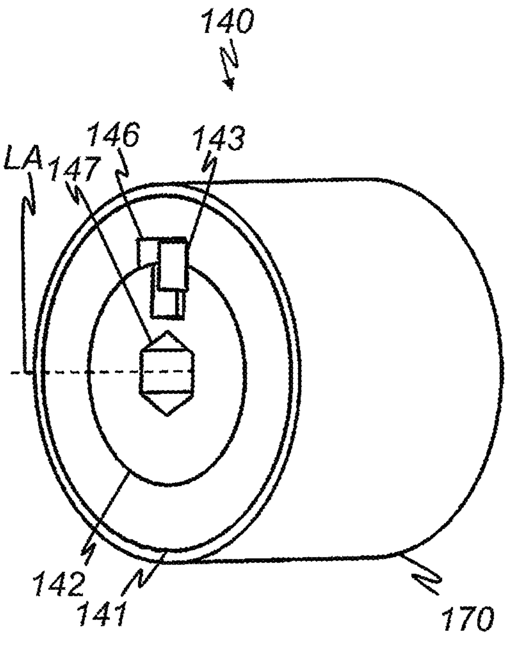

FIG. 4 shows a schematic representation of the centrifugal clutch 140 of a damping system 100 according to the invention at a speed of the rotary element below the switching speed (FIG. 4A) and at a speed of the rotary element above the switching speed (FIG. 4B).

At the speed below the switching speed, the connecting element 143 is completely in the inner rotor 142 so that the inner rotor 142 can rotate freely in the outer rotor 141 (FIG. 4A). Consequently, the rotary element connected to the inner rotor 142 is not coupled to the damping device 150 connected to the outer rotor 141 so that the rotation of the rotary element is not dampened by the damping device 150. Accordingly, a slow movement of the flap of the vehicle relative to the body of the vehicle is not dampened by the damping system.

At the speed above the switching speed, the connecting element 143 is partially driven out of the inner rotor 142 by the centrifugal force and interlockingly engages in the recess 146 of the outer rotor 141 (FIG. 4B). Accordingly, the inner rotor 142 is form-fittingly coupled to the outer rotor 141 so that the rotation of the rotary element is dampened by the damping device 150. Consequently, a rapid movement of the flap of the vehicle relative to the body of the vehicle is dampened by the damping system.

FIG. 5

Figure 5A:
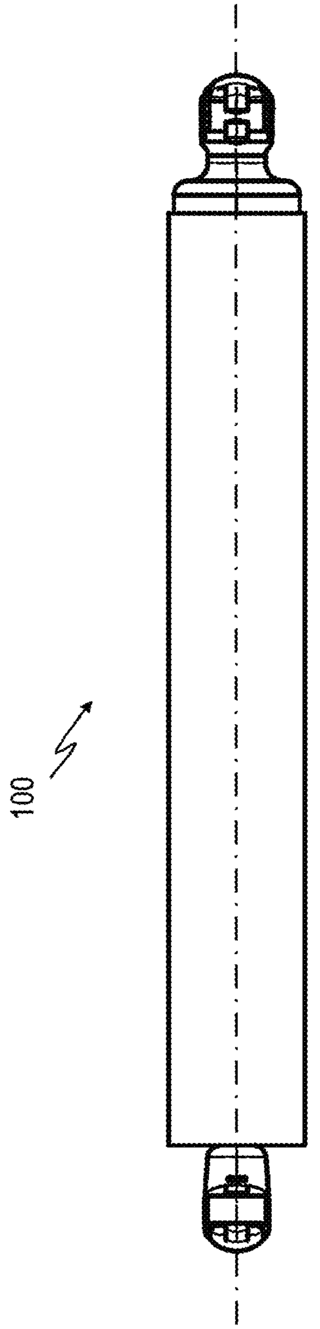
FIG. 5 shows a partial longitudinal section of an alternative exemplary embodiment of a damping system according to the invention.
Figure 5B:
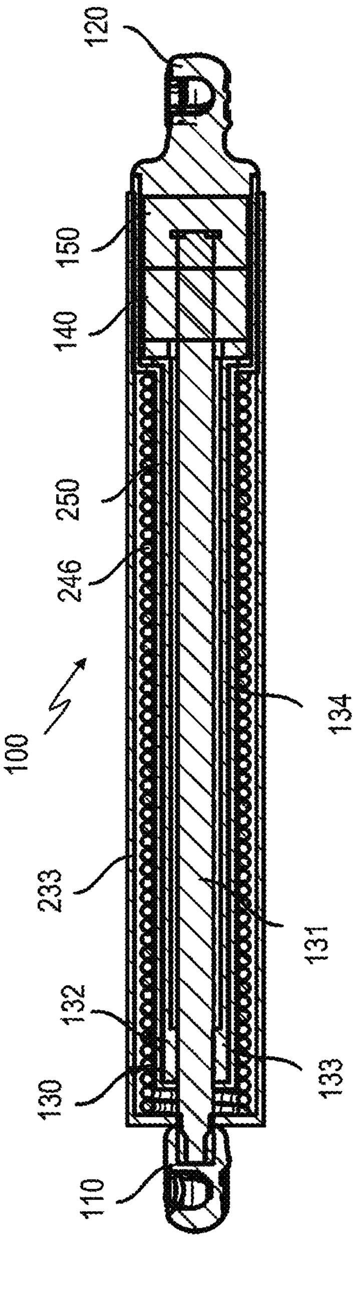

An alternative embodiment of the invention shown in FIG. 5 provides for a spindle gear 130 with the spindle nut 132 as a rotary element. In this case, the threaded spindle 131 is designed axially displaceable and non-rotatable and is connected directly or indirectly to the first coupling element 110. As can be seen from FIG. 5, the coupling element 110 can be connected to one end of the threaded spindle 131, for example by means of a threaded connection. A translation of the coupling element 110 and the threaded spindle 131 connected thereto is translated into a rotation of the spindle nut 132 designed here as a rotary element that can be made of plastics material, for example. As can be seen from FIG. 5, the spindle nut 132 has a threaded part 133 in threaded engagement with the threaded spindle 131 and a sleeve part 134 proceeding from the threaded part 133 and extending in the direction of the damping device.

The spindle nut 132 is mounted, for example, in a sleeve 250 which serves as a housing and can be sealingly connected to the second coupling element 120. In the shown exemplary embodiment, a casing tube 233 surrounds the helical spring 246, the centrifugal clutch 140 and the damping device 150 which is fastened to the threaded spindle 131 in the region of the first coupling element 110 and is guided axially movably on the sleeve 250 in the region of the centrifugal clutch 140 and the damping device 150. Ends of the helical spring 246 can be supported on the casing tube 233 and on the sleeve 250. However, the casing tube 233 can also be omitted, wherein a support element, e.g. in the form of a disk, must be provided in the region of the first coupling element 110.

An embodiment (not shown) provides a two-part casing tube with a spring sleeve and a tube element axially movable relative thereto, guided on the outside of the spring sleeve, and sealingly fastened to the sleeve 250. A sealing element, for example in the form of an O-ring, can be provided on the spring sleeve, which allows for a seal with the tube element.

The spindle nut 132 as a rotary element can be connected to the inner rotor 142 of the centrifugal clutch 140 described above in order to transmit its rotation thereto. The inner rotor 142 has a suitable connecting element for connection to the sleeve part 134 of the spindle nut 132. The resulting advantage is an overall simple and economical construction of the damping system 100.

The invention claimed is:

1. A damping system for damping a movement of a flap of a vehicle relative to a body of the vehicle, the damping system comprising:

two coupling elements for coupling the damping system to the flap and to the body, wherein the two coupling elements are connected to one another so as to be linearly displaceable relative to one another along a longitudinal axis of the damping system;

a threaded spindle aligned along the longitudinal axis;

a spindle nut guided on the threaded spindle;

a spindle gear with a rotary element selected from the threaded spindle and the spindle nut, wherein the spindle gear is connected to a first of the two coupling elements in such a way that the spindle gear translates a translation of the first coupling element along the longitudinal axis relative to the second coupling element into a rotation of the rotary element about the longitudinal axis;

a damping device; and a centrifugal clutch, wherein the centrifugal clutch is configured to connect the rotary element to the damping device for damping the rotation of the rotary element when a speed of the rotary element exceeds a switching speed.

2. The damping system according to claim 1, wherein the centrifugal clutch comprises an outer rotor rotatable about the longitudinal axis relative to the second coupling element and an inner rotor rotatably mounted in the outer rotor about the longitudinal axis relative to the outer rotor and to the second coupling element, wherein the rotary element of the spindle gear is connected to the inner rotor for transmitting its rotation to the inner rotor, wherein the inner rotor comprises a connecting element which is configured to connect the inner rotor to the outer rotor for transmitting its rotation to the outer rotor when the speed of the rotary element exceeds the switching speed, wherein the damping device for damping the rotation of the outer rotor is connected to the outer rotor.

3. The damping system according to claim 2, wherein the connecting element is configured to form-fittingly connect the inner rotor to the outer rotor with respect to a rotation about the longitudinal axis when the speed of the rotary element exceeds the switching speed.

4. The damping system according to claim 2, wherein the connecting element comprises a displacement element mounted so as to be radially displaceable to the longitudinal axis relative to the inner rotor.

5. The damping system according to claim 2, wherein an inner surface of the outer rotor facing the inner rotor comprises a recess for partially receiving the connecting element.

6. The damping system according to claim 5, wherein the recess is shaped in such a way that the connecting element is driven out of the recess toward the longitudinal axis in a release direction during rotation of the inner rotor about the longitudinal axis relative to the outer rotor.

7. The damping system according to claim 5,
wherein the recess is shaped in such a way that the connecting element is blocked in the recess during rotation of the inner rotor about the longitudinal axis relative to the outer rotor in a blocking direction.

8. The damping system according to claim 2, wherein the centrifugal clutch comprises a spring element, wherein the spring element is configured to separate the rotary element from the damping device when the speed of the rotary element falls below the switching speed.

9. The damping system according to claim 8, wherein the spring element connects the connecting element to the inner rotor in such a way that the spring element exerts a spring force on the connecting element directed toward the longitudinal axis.

10. The damping system according to claim 9,
wherein the damping system comprises a friction element, wherein the friction element frictionally connects the rotary element to the damping device for damping the rotation of the rotary element, independently of the speed of the rotary element.

11. The damping system according to claim 10, wherein the friction element comprises a tolerance ring, wherein the tolerance ring frictionally connects the inner rotor to the outer rotor.

12. The damping system according to claim 1,
wherein the damping device comprises a fluid rotary damper.

13. The damping system according to claim 2,
wherein the damping device comprises a friction surface fastened to the outer rotor and a mating friction surface fastened to the second coupling element of the damping system, wherein the friction surface interacts with the mating friction surface in a frictionally engaged manner.

14. A vehicle comprising:
a body;
a flap movable relative to the body; and
a damping system according to claim 1, wherein one of the two coupling elements of the damping system is coupled to the flap and one to the body.

15. A use of a damping system according to claim 1 for damping a movement of a flap of a vehicle relative to a body of the vehicle, wherein one of the two coupling elements of the damping system is coupled to the flap and one to the body.

* * * * *